United States Patent
Guey et al.

(10) Patent No.: US 7,889,799 B2
(45) Date of Patent: Feb. 15, 2011

(54) METHOD AND APPARATUS FOR OFDM CHANNEL ESTIMATION

(75) Inventors: Jiann-Ching Guey, Cary, NC (US); Havish Koorapaty, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1232 days.

(21) Appl. No.: 11/497,658

(22) Filed: Aug. 2, 2006

(65) Prior Publication Data
US 2008/0031370 A1 Feb. 7, 2008

(51) Int. Cl.
*H04K 1/10* (2006.01)
*H04L 27/28* (2006.01)

(52) U.S. Cl. ..................................... 375/260

(58) Field of Classification Search .......... 375/147, 375/148, 260, 267, 347, 224, 233, 262, 299, 375/316, 340, 341, 348; 370/203, 328, 342, 370/335, 436, 441, 480, 208
See application file for complete search history.

(56) References Cited

U.S. PATENT DOCUMENTS

| | | | |
|---|---|---|---|
| 7,012,882 B2 * | 3/2006 | Wang et al. | 370/208 |
| 7,184,495 B2 * | 2/2007 | Thomson et al. | 375/340 |
| 7,327,812 B2 * | 2/2008 | Auer | 375/347 |
| 7,627,067 B2 * | 12/2009 | Coulson | 375/362 |
| 2002/0003774 A1 * | 1/2002 | Wang et al. | 370/208 |
| 2002/0034213 A1 * | 3/2002 | Wang et al. | 375/132 |
| 2006/0018393 A1 * | 1/2006 | Gore et al. | 375/260 |
| 2006/0045192 A1 | 3/2006 | Hayashi | |
| 2007/0121554 A1 * | 5/2007 | Luo et al. | 370/335 |
| 2007/0165726 A1 * | 7/2007 | Ding et al. | 375/260 |

FOREIGN PATENT DOCUMENTS

EP 1580 950 A1 9/2005
WO 2006/036759 A1 4/2006

OTHER PUBLICATIONS

A Comparison Of Pilot-Aided Channel Estimation Methods Of OFDM Systems. Michele Morelli and Umberto Mengali, Fellow, IEEE.*

(Continued)

*Primary Examiner*—David C Payne
*Assistant Examiner*—Syed Haider
(74) *Attorney, Agent, or Firm*—Coats & Bennett, P.L.L.C.

(57) ABSTRACT

According to methods and apparatus taught herein, an Orthogonal Frequency Division Multiplexed (OFDM) transmitter increases pilot density in the edge regions of an OFDM signal, such as by using additional pilot sub carriers in the edge regions. For example, the OFDM signal includes first pilot sub carriers uniformly distributed across the frequency band of the OFDM signal, and second pilot sub carriers distributed within the edge regions. A corresponding OFDM receiver circuit uses the increased pilot density to improve channel estimation. For example, the receiver circuit uses the first pilot sub carriers in a Maximum Likelihood (ML) estimation process to obtain first channel estimates, and uses the results of ML estimation along with the second pilot sub carriers in a Minimum Mean Square Error (MMSE) estimation process to obtain second channel estimates. The receiver forms the improved channel estimates using the first and second channel estimates.

10 Claims, 3 Drawing Sheets

OTHER PUBLICATIONS

Morelli, M. et al., "A Comparison of Pilot-Aided Channel Estimation Methods for OFDM Systems," IEEE, Transactions on signal processing, Dec. 2001, vol. 49, No. 12, pp. 3065-3073.*

Auer, Gunther and Karipidis, Eleftherios. "Pilot Aided Channel Estimation for OFDM: a Separated Approach for Smoothing and Interpolation." IEEE. 2005. pp. 2173-2178.

Edfors, Ove et. al. "OFDM Channel Estimation by Singular Value Decomposition." IEEE Transactions on Communications, Jul. 1998, pp. 931-939. vol. 46, No. 7.

Edfors, Ove et. al. "Analysis of DFT-Based Channel Estimators for OFDM." Wireless Personal Communications. Jan. 2000, pp. 55-70, vol. 12, No. 1, Kluwer Academic Publishers, Netherlands.

Yang, Baoguo et. al. "Analysis of Low-Complexity Windowed DFT-Based MMSE Channel Estimator for OFDM Systems." IEEE Transactions on Communications, Nov. 2001, pp. 1977-1987, vol. 49, No. 11.

Sorenson, H. W. "Linear Mean-Square Estimators." *Parameter Estimation: Principles and Problems*. pp. 149-152. Marcel Dekker, New York, New York.

Co-pending U.S. Appl. No. 11/848,581, filed Aug. 31, 2007.

Guey, J.-C. et al. "Low Complexity Channel Estimation for Minimizing Edge Effects in OFDM Systems." 2007 IEEE 65th Vehicular Technology Conference (VTC2007-Spring), Apr. 22-25, 2007, pp. 1440-1444.

Morelli, M. et al. "A Comparison of Pilot-Aided Channel Estimation Methods for OFDM Systems." IEEE Transactions on Signal Processing, Dec. 2001, vol. 49, No. 12, pp. 3065-3073.

Guey, J.-C. "Method and Apparatus for Robust Control Signaling Distribution in OFDM Systems." Co-pending U.S. Appl. No. 11/848,581, filed Aug. 31, 2007.

* cited by examiner

METHOD AND APPARATUS FOR OFDM CHANNEL ESTIMATION

TECHNICAL FIELD

The present invention generally relates to communication systems employing Orthogonal Frequency Division Multiplexing (OFDM), and particularly relates to methods and apparatus for channel estimation in such systems.

BACKGROUND

OFDM represents a developing area of interest in both wired and wireless communication systems. OFDM simultaneously offers the promise of higher aggregate data rates, as well as more robust performance in selective fading environments.

In simple terms, an OFDM signal comprises a plurality of sub carriers that are spaced apart over a given frequency band. Thus, transmission with OFDM involves transmitting data symbols on multiple frequency sub carriers, where each sub carrier comprises a narrow band signal. Non-limiting examples of the application of OFDM to communication systems include various standards promulgated by the Institute of Electrical and Electronics Engineers, Inc. (IEEE), such as the IEEE 802.16 and 802.20 standards.

As with virtually all higher-rate communication systems having transmission signals subject to propagation channel distortion, estimation of the propagation channel in OFDM systems represents a critical element of receiver performance. To that end, OFDM transmitters generally adopt one of two conventional approaches to supporting receiver channel estimation.

In a first approach, an OFDM transmitter uses the same sub carriers to send data symbols at certain times, and to send pilot symbols at other times. Doing so allows a corresponding receiver to estimate the sub carrier channels based on receiving known pilots on those sub carrier frequencies. Of course, the duration between pilot transmissions must be short enough that the channel estimates remain valid for data symbols received between pilot transmissions.

In a second approach, the transmitter designates a certain number of the sub carriers as "pilot" sub carriers, meaning that these sub carriers exclusively carry pilot symbols. Remaining ones of the sub carriers comprising the OFDM signal carry the data symbols. In a conventional implementation of this approach, the pilot sub carriers are uniformly distributed among the data sub carriers.

Uniform distribution of the pilot sub carriers in this latter approach simplifies Maximum Likelihood (ML) estimation of the channel, but such estimation suffers from so-called "boundary" effects within the edge regions of the OFDM signal. Other, more computationally complex channel estimation algorithms can be used, such as a Minimum Mean Square Error (MMSE) estimation algorithm, but such algorithms often are prohibitively complex because of the matrix sizes involved.

SUMMARY

Methods and apparatus taught herein improve OFDM channel estimation by increasing pilot density in one or both of the edge regions of the frequency band spanned by the OFDM signal. The extra pilot symbols provided by the increased pilot density enables improved channel estimation by an appropriately configured receiver within the edge regions of the OFDM signal. The receiver thus improves overall (pilot) channel estimation based on extra pilot symbols received for the edge region(s) of the OFDM signal. Thus, as used herein, "improving" channel estimation and the generation of "improved" channel estimates connote the generation of channel estimates that consider or otherwise compensate for "edge effects" in one or both edge regions of the OFDM signal by basing channel estimation at least in part on the extra pilot information received for the edge region(s).

In one embodiment, a transmitter circuit implements a method of increasing pilot density in one or both edge regions of the OFDM signal's frequency band based on transmitting extra pilot symbols on one or more sub carriers that are in the edge region(s) of the frequency band. For example, in one embodiment, the transmitter circuit is configured to transmit first pilot symbols on first pilot sub carriers that are uniformly distributed across the frequency band, including within the edge regions, and to transmit the extra pilot symbols as second pilot symbols on second pilot sub carriers distributed in the edge region(s) of the frequency band.

One embodiment of a corresponding receiver method uses the increased pilot density to improve channel estimation for the OFDM signal within the one or both edge regions of the frequency band. For example, a receiver circuit may be configured to receive first pilot symbols via first pilot sub carriers uniformly distributed across the frequency band, and receive second pilot symbols via second pilot sub carriers distributed in the one or both edge regions. The receiver circuit uses the increased pilot density to improve channel estimation for the OFDM signal in the edge region(s).

In one such embodiment, a receiver circuit uses the increased pilot density to improve channel estimation by generating first channel estimates based on the first pilot symbols, and generating second channel estimates based on the first channel estimates and the second pilot symbols. That is, a first estimation process, which uses the first pilot symbols and therefore spans the frequency band of the OFDM signal, provides information for a second estimation process, which uses the second pilot symbols and therefore spans the edge regions of the frequency band. The receiver forms improved channel estimates based on the first and second channel estimates, such as by forming a concatenated set of values, where frequencies corresponding to the edge regions are represented by the second channel estimates, and frequencies corresponding to a remaining "middle" portion of the frequency band are represented by first channel estimates.

Of course, the receiver circuit may be configured to form improved channel estimates according to other combinations or functions of the first and second channel estimates, whereby it uses values of the second channel estimates to improve channel estimation at least for the edge regions.

In at least one embodiment of obtaining the improved channel estimates, the receiver circuit generates the first channel estimates using a Maximum Likelihood (ML) estimation process based on the first pilot symbols, and then uses the second pilot symbols in a Minimum Mean Square Error (MMSE) estimation process. Advantageously, the receiver circuit uses results obtained from the ML estimation process to bias the MMSE estimation process. For example, the ML estimation process yields a mean channel estimate that spans the frequency band, and yields channel covariance or correlation information. More broadly, the ML estimation process provides information on channel statistics for the MMSE process estimation.

With implementation of the above method, or variations of it, the ML estimation process is simplified by restricting its calculations to pilot symbol observations made for the uniformly spaced pilots, i.e., observations for the first pilot symbols as received on the first pilot sub carriers, which are uniformly distributed across the frequency band of the OFDM signal. The method gains further advantages by determining channel statistics for the MMSE estimation process from the ML estimation results, which is information that would otherwise not be readily available a priori for use by the MMSE estimation process. Still further MMSE estimation process advantages are gained by restricting the matrix dimensions used for MMSE estimation to the observations made for the second pilot symbols carried by the second pilot sub carriers positioned within the edge region(s) of the frequency band.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
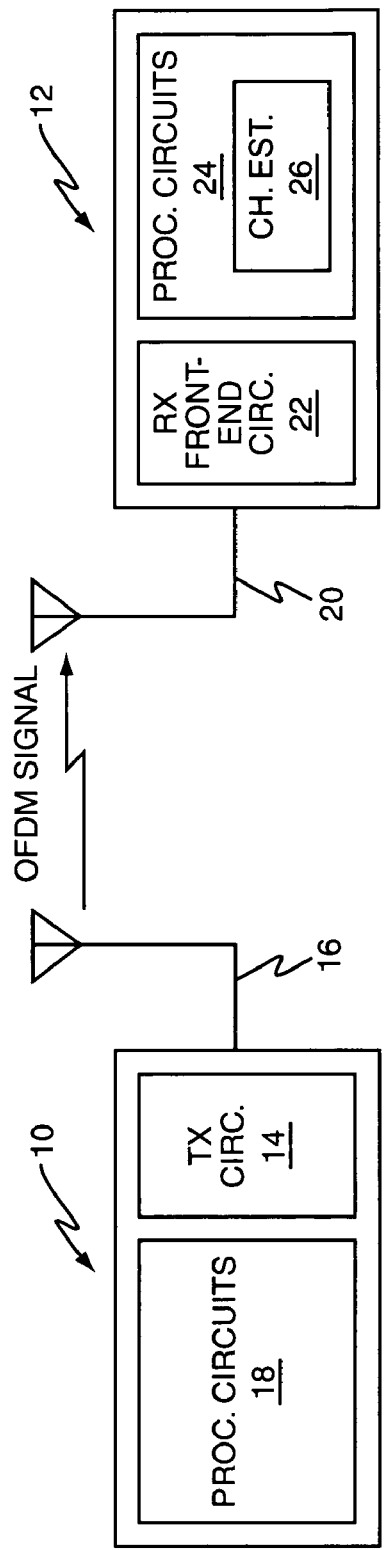
FIG. 1 is a block diagram of embodiments of an OFDM transmitter configured to transmit with an increased pilot density in one or both edge regions of its OFDM signal, and a corresponding OFDM receiver configured to use the increased pilot density for channel estimation improvement.

FIG. 1 presents a simplified illustration of a transmitter 10 and a corresponding receiver 12. The transmitter 10 includes wireless transmission circuits 14 for generating an Orthogonal Frequency Division Multiplexing (OFDM) signal for transmission via an associated antenna 16. Transmitter processing circuit(s) 18 within the transmitter 10 are configured to generate the OFDM signal with an increased pilot density in one or both edge regions of the frequency band spanned by the OFDM signal.

Complementing this OFDM signal configuration, the receiver 12 is configured to use the increased pilot density to improve its channel estimation operations, at least within the edge regions of the OFDM signal. To that end, the receiver 12 includes a receive antenna 20 coupled to receiver front-end circuits 22 (e.g., amplifiers, filters, and digitizers), which provide received signal samples to one or more processing circuits 24. In the illustrated embodiment, the one or more processing circuits 24 include a channel estimation circuit 26 that is configured to use the increased (edge region) pilot density to improve the channel estimations determined for the received OFDM signal, at least within the edge regions of that signal.

Figure 2:
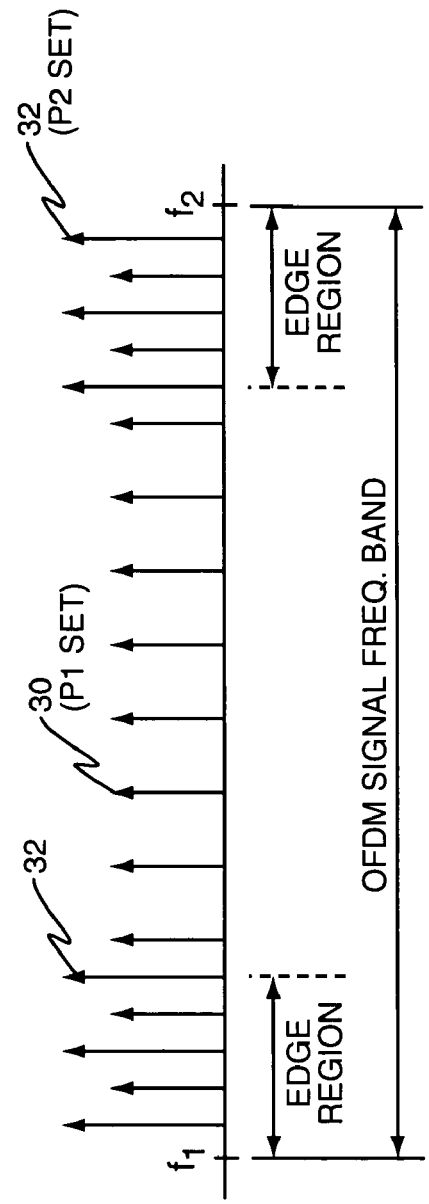
FIG. 2 is a diagram of one embodiment of an OFDM signal, having increased pilot density in its edge regions.

Within the above context, FIG. 2 presents a simplified illustration of one embodiment of an OFDM signal having increased pilot density within its edge regions. More particularly, FIG. 2 illustrates first pilot sub carriers 30, which are collectively referred to as the "P1 Set" of pilot sub carriers, and second pilot sub carriers 32, which are collectively referred to as the "P2 Set" of pilot sub carriers. The first pilot sub carriers 30 are uniformly distributed across the frequency band spanned by the OFDM signal, including within the edge regions of the OFDM signal, i.e., the range of frequencies at or near the boundaries of the frequency band spanned by the collection of data and pilot sub carriers comprising the OFDM signal.

On that point, those skilled in the art will appreciate that the plurality of data sub carriers included within the illustrated OFDM signal are not shown for simplicity of illustration. However, it should be understood that, in one or more embodiments, the first pilot sub carriers 30 are uniformly interspersed among the data sub carriers, e.g., every tenth sub carrier frequency position represents a position occupied by a respective one of the first pilot sub carriers 30. On the other hand, the second pilot sub carriers 32 are not uniformly spaced across the OFDM signal, but rather are positioned within the edge regions. More particularly, in at least one embodiment, the second pilot sub carriers 32 are constrained to frequency positions within the edge regions not occupied by the first pilot sub carriers 30. With that configuration, the first and second pilot sub carriers 30 and 32 comprise mutually exclusive sets of pilot sub carriers.

The illustrated channel estimation circuit 26 uses the first and second pilot symbols carried by the different sets of pilot sub carriers for improved channel estimation. That is, the channel estimation circuit 26 uses the second pilot symbols carried on the second pilot sub carriers 32 to improve channel estimation in the edge regions of the received OFDM signal. In this context, it should be understood that the channel estimation circuit 26 may comprise all or part of one or more receiver processing circuits, such as one or more baseband digital signal processing circuits, microprocessors, Application Specific Integrated Circuits (ASICs), Field Programmable Gate Arrays (FPGAs), etc.

Generally, the channel estimation circuit 26 may comprise hardware, software, or any combination thereof. Particularly, in at least one embodiment, the channel estimation circuit 26 is at least partly implemented as one or more computer program objects, such as computer program instructions to use the increased pilot density for improved channel estimation in the edge regions of the received OFDM signal.

Figure 3:
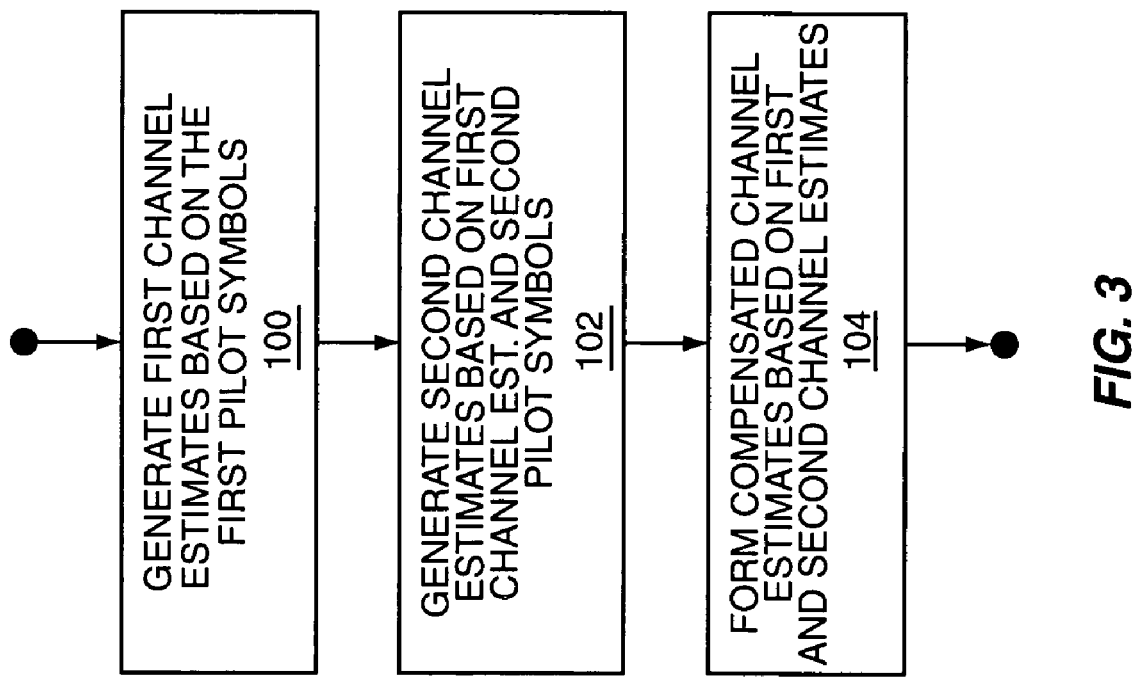
FIG. 3 is a logic flow diagram of one embodiment of receiver processing logic, for using the increased pilot density to improve channel estimation for an OFDM signal having increased pilot density in its edge region(s).

Whether implemented in hardware, software, or any combination thereof, FIG. 3 illustrates one embodiment of processing logic for using the increased pilot density to improve channel estimation within the edges of the received OFDM signal. Processing begins with the channel estimation circuit 26 generating first channel estimates based on the first pilot symbols (Step 100). In other words, the channel estimation circuit 26 uses its observations of the pilot symbols received on the first pilot sub carriers 30 to determine channel estimates for the plurality of frequency positions occupied by the entire OFDM signal. In carrying out this estimation, the one or more processing circuits 24 receive digital baseband samples of the OFDM signal from the front-end circuits 22, and operate on the incoming signal samples, or on buffered versions of the samples.

Processing continues with the channel estimation circuit 26 generating second channel estimates based on the first channel estimates and the second pilot symbols (Step 102). In other words, the channel estimation circuit 26 uses its observations of the pilot symbols received on the second pilot sub carriers—for the same received signal time period—and results obtained from the first channel estimation process, to obtain second channel estimates.

Processing continues with the channel estimation circuit 26 forming improved channel estimates based on the first and second channel estimates (Step 104). For example, in one embodiment, the improved channel estimates comprise a combination of the second channel estimates, as determined for the edge regions of the OFDM signal, and the first channel estimates as determined for a middle region of the OFDM signal. In other embodiments, the channel estimation circuit 26 forms improved channel estimates by using some other function or combination of the first and second channel estimates. In any case, additional processing circuits in the receiver 12 use the improved channel estimates in received signal processing operations, such as in demodulating the received OFDM to obtain data symbols for decoding and further processing.

To that end, those skilled in the art will appreciate that the receiver 12 includes demodulation, decoding, and other signal processing circuits and purpose-specific elements, although FIG. 1 does not depict such elements for simplicity of discussion. For example, the receiver 12 may comprise a base station configured for use in a wireless communication network. Alternatively, the receiver 12 may comprise a mobile station or other portable terminal for use in such networks. In embodiments where the receiver 12 comprises a wireless communication device, such as a cellular radiotelephone, pager, Portable Digital Assistant (PDA), laptop/palmtop computer, or other type of mobile communication device, the receiver 12 may include user interface circuits, including keypads, display screens, audio input/output circuits, and the like. Of course, the particular configuration of receiver 12 will vary with its intended use, and the particulars of wireless base station embodiments generally will differ from those of wireless mobile station embodiments.

Figure 4:
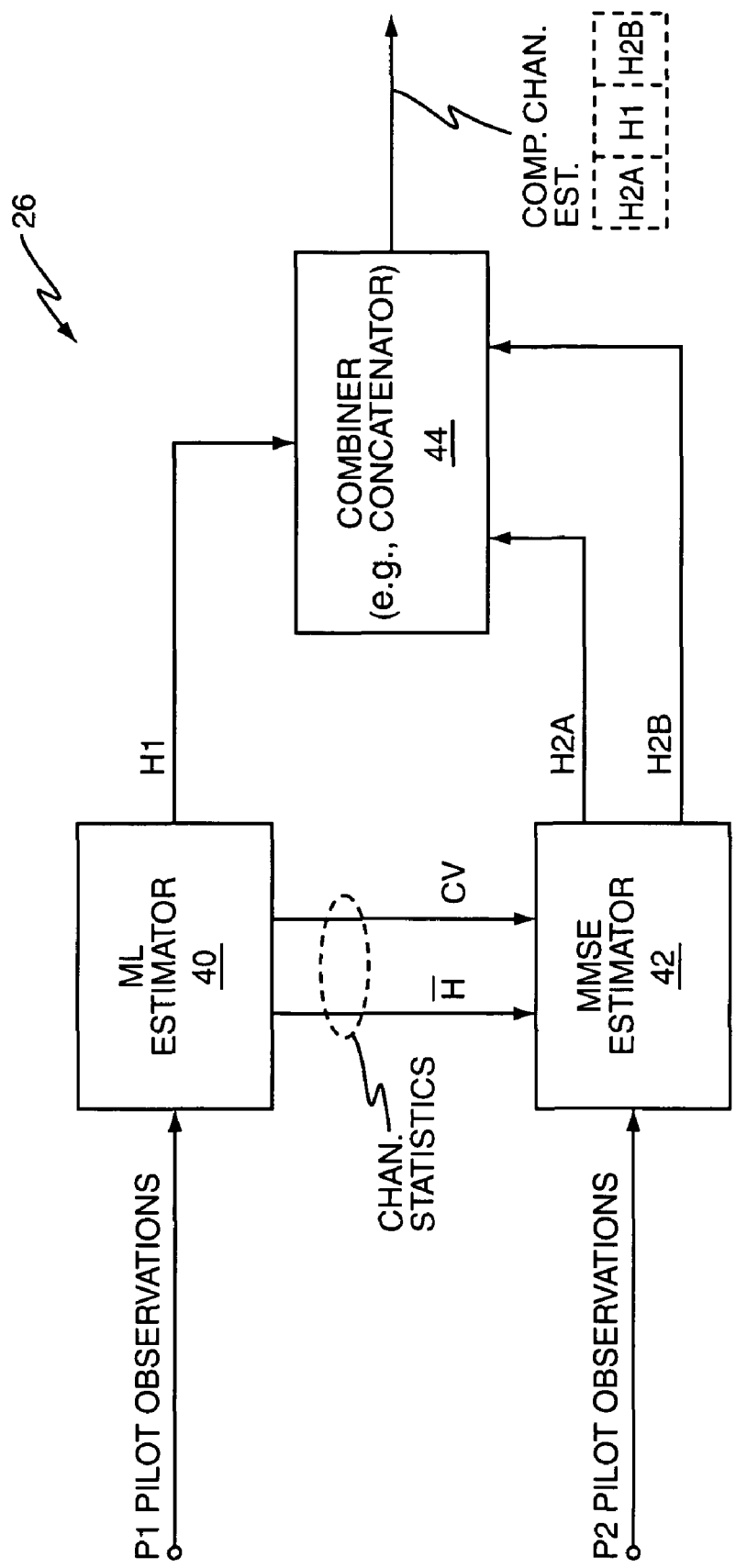
FIG. 4 is a block diagram of one embodiment of a channel estimator configured to use increased (edge region) pilot density of a received OFDM signal to improve channel estimation.

With these broad ranges of applications in mind, FIG. 4 illustrates functional circuit elements for an embodiment of the channel estimation circuit 26 that can be implemented in base stations, mobile stations, and non-wireless embodiments of the receiver 12. The illustrated channel estimation circuit 26 comprises a Maximum Likelihood (ML) estimation circuit 40, referred to as the ML estimator 40, a Minimum Mean Square Error (MMSE) estimation circuit 42, referred to as the MMSE estimator 42, and a combiner circuit 44.

In operation, the ML estimator 40 generates the first channel estimates using an ML estimation process based on the first pilot symbols. In turn, the MMSE estimator 42 generates the second channel estimates for the one or both edge regions (of the OFDM signal) using an MMSE estimation process based on the second pilot symbols and biased from the ML estimation process. In this context, the ML estimation process "biases" the MMSE estimation by providing the channel statistics needed for MMSE estimation.

For notational convenience in FIG. 4, the channel estimates generated by the ML estimation process are labeled as the "H1" estimates, while the channel estimates generated by the MMSE estimation process are labeled as the "H2A" and "H2B" estimates. The H2A and H2B estimates individually correspond to the two edge regions of the OFDM signal—see, for example, the "left" and "right" edge regions depicted in FIG. 2. Thus, the H1 estimates correspond to those derived from the first pilot symbols, and the H2A/H2B estimates correspond to those derived from the second pilot symbols.

The combiner circuit 44 receives the H1, H2A, and H2B channel estimates, and forms improved channel estimates from them. In one embodiment, the combiner circuit 44 forms improved channel estimates as a concatenated set of estimates H2A-H1-H2B, where the H2A and H2B estimates are taken as the edge region channel estimates, the remaining ones of the H1 estimates are taken as the middle region channel estimates.

Broadly, then, the channel estimation circuit 26 can be configured via hardware, software, or any combination thereof, to implement a method of channel estimation comprising receiving an OFDM signal that includes first pilot symbols on first pilot sub carriers that are uniformly distributed across the frequency band of the OFDM signal, and second pilot symbols on second pilot sub carriers that are distributed within one or both edge regions of the frequency band. With that, the method implemented by the channel estimation circuit 26 continues with generating first channel estimates using a Maximum Likelihood (ML) estimation process, based on the first pilot symbols, and generating second channel estimates using a Minimum Mean Square Error (MMSE) estimation process, based on the second pilot symbols and channel statistics determined from the ML estimation process.

Advantageously, the channel estimation circuit 26 is configured in one or more embodiments to form improved channel estimates for the OFDM signal as a function of the first and second channel estimates. For example, it may form a combined set of channel estimates having the second channel estimates for frequencies within the edge regions and having first channel estimates for frequencies between the edge regions. In a particular embodiment, the channel estimation circuit 26 forms an overall set of improved channel estimates by substituting values of the second channel estimates for corresponding ones of the first channel estimates, such that the overall set of improved channel estimates comprises values of the second channel estimates for frequencies corresponding to the edge regions, and comprises values of the first channel estimates for frequencies between the edge regions. The improved channel estimates thus provide a basis for improved processing of the received OFDM signal, which yields benefits such as lower data error rates for data received on the data sub carriers of the OFDM signal.

Note that the improved channel estimates effectively include, by virtue of the ML/MMSE processing, interpolated values corresponding to data sub carrier frequency positions. For example, the MMSE estimator is essentially a matrix multiplication that transforms (or interpolates) a pilot observation vector to an output vector of a greater dimension, thus expanding the channel estimates to cover the sub carriers used for data transmission.

To better understand the above ML and MMSE estimation processes, one must appreciate that the data (and pilot) symbols Λ[k] are modulated onto the plurality of K sub carriers comprising the OFDM signal transmitted over a frequency selective channel between the transmitter 10 and the receiver 12, which can be described by its frequency response H[k]. The corresponding discrete time signal is a length-K Inverse Discrete Fourier Transform (DFT) of Λ[k], prefixed by a cyclic extension from the end of the signal block. Making the signal's cyclic prefix longer than the known or expected delay of the channel allows the receiver 12 to extract a section of the channel-filtered received OFDM signal in which the discrete frequency domain received signal samples can be expressed as, $$X[k]=\Lambda[k]H[k]+Z[k] \qquad \text{Eq. (1)}$$

where k=0, 1, ..., K−1, Z[k] is the Additive White Gaussian Noise (AWGN) with variance $\sigma_Z^2$.

The time domain equivalent of Eq. (1) is given by, $$x[n]=F_K^{-1}\{X[k]\}=\lambda[n]\otimes h[n]+z[n],\ n=0,1,\ldots,K-1 \qquad \text{Eq. (2)}$$

where $F_K^{-1}\{X[\cdot]\}$ is the length−K IDFT defined as, $$x[n] = \mathcal{F}_K^{-1}\{X[k]\} = \frac{1}{K}\sum_{k=0}^{K-1} X[k]\exp\left(\frac{j2\pi nk}{K}\right) \quad \text{Eq. (3)}$$

and where "⊛" denotes the circular convolution between two, equal length sequences.

The length-K Discrete Fourier Transform (DFT) of a sequence x[n] is similarly defined as, $$X[k] = \mathcal{F}_K\{x[n]\} = \sum_{n=0}^{K-1} x[n]\exp\left(\frac{-j2\pi nk}{K}\right) \quad \text{Eq. (4)}$$

Thus, unless otherwise indicated herein, the DFT converts the discrete time index n to the discrete frequency index k, while the IDFT converts the discrete frequency index k to the discrete time index n. Further, the DFT (or IDFT) of a length greater than that of the underlying sequence implies that zeros are padded to the end of the sequence.

With the above in mind, one may rewrite Eq. (1) concisely in matrix form as, $$X = \Lambda H + Z \quad \text{Eq. (5)}$$

where the sequences X[k], H[k], and Z[k] are replaced by their corresponding column vectors X, H, and Z, respectively, while the symbol sequence Λ[k] is replaced by its K–dimensional diagonal matrix Λ. Thus, the subset of the received signal samples obtained by the receiver 12 for the pilot sub carriers—i.e., excluding the data sub carriers—of the OFDM signal may be defined as, $$X[p_k] = \Lambda[p_k]H[p_k] + Z[p_k], k=0, 1, \ldots, L_p-1 \quad \text{Eq. (6)}$$

where $p_0, p_1, \ldots, p_{L_p-1}$ are the indices of the sub carriers on which pilot symbols are transmitted. Thus, the sequence consisting only of pilot symbols can be formed as, $$X_p[k] = \Lambda_p[k]H_p[k] + Z_p[k], k=0, 1, \ldots, L_p-1 \quad \text{Eq. (7)}$$

such that, $$X_p[k] = X[p_k] \quad \text{Eq. (8)}$$

$$\Lambda_p[k] = \Lambda[p_k] \quad \text{Eq. (9)}$$

and $$H_p[k] = H[p_k] \quad \text{Eq. (10)}$$

Thus, the sequence $X_p[k]$ can be represented in its matrix form as, $$X_p = \Lambda_p H_p + Z_p \quad \text{Eq. (11)}$$

With Eq. (11), a Maximum Likelihood (ML) estimate of the channel, $\hat{H}_{ML|X_p}[k]$, based on the first pilot sub carriers, which are uniformly distributed across the frequency band of the OFDM signal, is given by, $$\hat{H}_{ML|X_p}[k] = F_{ML_p}\{x_p[n]w[n]\}, k=0, 1, \ldots, ML_p/2-1 \quad \text{Eq. (12)}$$

and $$\hat{H}_{ML|X_p}[k+K-ML_p] = F_{ML_p}\{x_p[n]w[n]\}, k=ML_p/2, \ldots, ML_p-1 \quad \text{Eq. (13)}$$

where $$x_p\{n\} = \mathcal{F}_{L_p}^{-1}\left\{\frac{X_p[k]}{\Lambda_p[k]}\right\} \quad \text{Eq. (14)}$$

is a length $ML_p$ Discrete Fourier Transform (DFT) of the $L_p$ received signal samples corresponding to the regularly spaced pilots, M is the pilot insertion period, i.e., $M=K/L_p$, and w[n] is a window function of the same length that nulls the response outside of the channel's known or estimated delay spread.

The ML estimation process as based on the first pilot sub carriers involves a DFT of the shortest possible length, i.e., the number of regularly spaced pilot sub carriers included within the plurality of sub carriers comprising the overall OFDM signal, which simplifies the ML estimation process. Further, the ML estimation process provides channel statistics for the MMSE estimation process, where, in general, such information would not otherwise be available.

In more detail, assuming the channel between the transmitter 10 and the receiver 12 is frequency selective, the channel's frequency correlation can be related to its time domain multipath channel, which is given as, $$h[n] = \bar{h}[n] + \tilde{h}[n] \quad \text{Eq. (15)}$$

which is normally assumed to be time-independent and Gaussian with known mean $\bar{h}[n]$ and variance γ[n]. Note that even though the multipath channel h[n] is defined over $0 \leq n < K$, its support should be less than the length of the cyclic prefix of the OFDM signal being transmitted. With these assumptions, the channel's frequency correlation is given by, $$\Gamma[k_1-k_2] \triangleq E\{(H[k_1] - \bar{H}[k_1])(H[k_2] - \bar{H}[k_2])^*\}$$

$$= \sum_{n=0}^{K-1} \gamma[n] e^{-j\frac{2\pi n(k_1-k_2)}{K}} \quad \text{Eq. (16)}$$

which is the channel's Power Spectral Density (PSD) sampled at $(k_1-k_2)$ Mod K.

Assuming that all the involved random components in the system model are jointly Gaussian and independent from the AWGN, an MMSE estimation of the channel H based on pilot sub carrier observations $X_p$ is given as, $$\hat{H}_{MMSE} = E\{H|X_p\} \quad \text{Eq. (17)}$$

which can be rewritten as, $$\hat{H}_{MMSE} = \bar{H} + \Pi_{HH_p}\Lambda_p^H(\Lambda_p\Pi_{H_p}\Lambda_p^H + \sigma_Z^2 I)^{-1}\Lambda_p(\Lambda_p^{-1}X_p - \bar{H}_p) \quad \text{Eq. (18)}$$

where I is an identity matrix, and where $$\bar{H} \triangleq E\{H\}, \quad \text{Eq. (19)}$$

represents the mean of the channel, $$\bar{H}_p \triangleq E\{H_p\}, \quad \text{Eq. (20)}$$

represents the mean of the channel at the pilot locations, $$\Pi_{HH_p} \triangleq E\{(H - \overline{H})(H_p - \overline{H}_p)^H\} \qquad \text{Eq. (21)}$$

represents the cross-covariance of the channel at all locations and the channel at the pilot locations and $$\Pi_{H_p} \triangleq E\{(H_p - \overline{H}_p)(H_p - \overline{H}_p)^H\}, \qquad \text{Eq. (22)}$$

represents the covariance of the channel at the pilot locations

The elements of the covariance functions $\Pi_{HH_p}$ and $\Pi_{H_p}$ are derived from the channel's Power Delay Profile (PDP), and are given by, $$[\Pi_{HH_p}]_{ij} = E\{(H[i] - \overline{H}[i])(H[p_j] - \overline{H}[p_j])^*\} = \Gamma[i-p_j] \qquad \text{Eq. (23)}$$

and $$[\Pi_{H_p}]_{ij} = E\{(H[p_i] - \overline{H}[p_i])(H[p_j]\overline{H}[p_j])^*\} = \Gamma[p_i-p_j] \qquad \text{Eq. (24)}$$

Note that, without benefit of any prior knowledge, the impulse response h[n] of a frequency-selective channel commonly is assumed to have zero mean ($\overline{h}[n]=0$), and the PDP $\gamma[n]$ is a slowly varying parameter that depends on the particular propagation environment.

Within the foregoing mathematical framework, one may express the pilot observations for the first pilot sub carriers using the subscript "r" to denote their regular spacing across the frequency band of the OFDM signal. Similarly, one may express the pilot observations for the second pilot sub carriers using the subscript "e" to denote their distribution only within the edge regions of the OFDM signal.

Thus, the sequence corresponding only to the pilot symbols received on the first pilot sub carriers 30 is expressed as, $$X_r[k] = \Lambda_r H_r[k] + Z_r[k], \; k=0,1,\ldots,L_r-1 \qquad \text{Eq. (25)}$$

Similarly, the sequence corresponding only to the pilot symbols received on the second pilot sub carriers 32 is expressed as, $$X[e_k] = \Lambda_e H[e_k] + Z[e_k], \; k=0,1,\ldots,L_e-1 \qquad \text{Eq. (26)}$$

which yields, $$X_e[k] = \Lambda_e H_e[k] + Z_e[k], \; k=0,1,\ldots,L_e-1 \qquad \text{Eq. (27)}$$

corresponding to Eq. (25). Note that $\Lambda e$ also represent real scalar pilot values, and $e_0, e_1, \ldots, e_{L_e-1}$ are the indices of the second pilot sub carriers 32, on which the edge pilot symbols are transmitted as the "extra" pilot symbols for improvement of edge channel estimation by the receiver 12.

The sequence $X_e[k]$ can be represented in matrix form as, $$X_e = \Lambda_e H_e + Z_e \qquad \text{Eq. (28)}$$

and, likewise, the sequence $X_r[k]$ for the regularly spaced pilots can be expressed in matrix form as, $$X_r = \Lambda_r H_r + Z_r \qquad \text{Eq. (29)}$$

Thus, the complete set of pilot indices for the received OFDM signal depicted in FIG. 2, for example, is denoted as $p_k$, and is formed as a union of the regularly spaced pilot indices $r_k$ and the edge pilot indices $e_k$ as follows, $$\{p_k\} = \{r_k\} \cup \{e_k\} \qquad \text{Eq. (30)}$$

Using the above regular and edge pilot notation, the ML estimate of the channel as generated by the ML estimator 40 is given as, $$\hat{H}_{ML|X_r}[k] = \mathcal{F}_{ML_r}\left\{\frac{x_r[n]}{\Lambda_r} w[n]\right\}, \qquad \text{Eq. (31)}$$

$$k = 0, 1, \ldots, ML_r/2 - 1$$

and $$\hat{H}_{ML|X_r}[k + K - ML_r] = \mathcal{F}_{ML_r}\left\{\frac{x_r[n]}{\Lambda_r} w[n]\right\}, \qquad \text{(Eq. 32)}$$

$$k = ML_r/2, \ldots, ML_r - 1$$

where $$x_r\{n\} = F_{L_r}^{-1}\{X_r[k]\} \qquad \text{Eq. (33)}$$

is a length $L_r$ Discrete Fourier Transform (DFT) of the $L_r$ received signal samples corresponding to the regularly spaced pilots, and w[n] is a window function of the same length that nulls the response outside of the channel's known or estimated delay spread.

The ML estimation can be expressed as shown in Eq. (31) or Eq. (32) because of the use of a common scalar for the regularly spaced pilots. As intimated earlier herein, the ML estimation process generally experiences some estimation performance degradation in the edge regions of the OFDM signal, because it is forced to interpolate across edges not within the coherence bandwidth of the estimation process. Thus, the channel estimator 26 as taught herein uses MMSE estimation to improve for the performance degradation.

More particularly, the channel estimator 26 uses the ML estimation process carried out by the ML estimator 40 to provide channel statistics for the MMSE estimation process carried out by the MMSE estimator 42. In one or more embodiments, the ML estimates generated from the first pilot symbols, e.g., Eq. (32), are taken as the channel mean, $\overline{H}$, for use in the MMSE estimation process. Further, assuming that the noise variance, $\sigma_Z^2$, is known from the ML estimation process, the correlation of the residual error in the discrete frequency domain between two sub carriers $k_1$ and $k_2$ (with spacing $k=k_1-k_2$) can be approximated by, $$\hat{\Gamma}[k] = \mathcal{F}_{ML_r}\left\{\frac{\sigma_Z^2}{L_r \Lambda_r^2}|w[n]|^2\right\} \qquad \text{Eq. (34)}$$

If the regularly spaced pilots are assumed to have unit power, the MMSE channel estimate is given as $$\hat{H}_{MMSE|X_e} = \overline{H} + \Pi_{HH_e}\left(\Pi_{H_e} + \frac{\sigma_Z^2}{\Lambda_r^2}I\right)^{-1}(\Lambda_e^{-1}X_e - \overline{H}_e) \qquad \text{Eq. (35)}$$

where $$[\overline{H}]_i = \hat{H}_{ML|X_r}[i], \qquad \text{Eq. (36)}$$

Is the $i^{th}$ element of the channel mean derived from the ML estimate based on the regularly spaced pilots, $[\overline{H}_e]_i = \hat{H}_{ML|X_r}[e_i],$  Eq. (37)

Is the $i^{th}$ element of the channel mean vector for the edge pilots derived from the ML estimate based on the regularly spaced pilots, $[\Pi_{HH_e}]_{ij} = \hat{\Gamma}[i-e_j],$  Eq. (38)

Is the element in row i and column j of the matrix representing the cross-covariance between the channel at all locations and the channel at the edge pilot locations and $[\Pi_{H_e}]_{ij} = \hat{\Gamma}[e_i-e_j],$  Eq. (39)

Is the element in row i and column j of the matrix representing the covariance of the channel at at the edge pilot locations.

Because the number of edge pilots is much smaller than the number of regularly spaced pilots, the inversion of the kernel matrix in Eq. (35) is much simpler than it would be if MMSE estimation was carried out across the whole frequency band of the OFDM signal, using the regularly spaced pilots. Thus, although Eq. (35) expresses the estimate of all K sub carriers in the channel vector H, only a small segment near the edges needs to be evaluated. In this context, it is desirable to separate estimation processing within the two edge regions. In other words, the estimation of the channel within one edge region should not include pilot observations corresponding to the other edge region.

The above channel estimation processing effectively comprises a two-step estimation process that yields potentially significant performance improvements, with only a modest increase in processing complexity. Specifically, a receiver channel estimation method relies on receiving an OFDM signal having first and second pilot sub carriers 30 and 32. The first pilot sub carriers 30 are regularly spaced across the frequency band, and provide first pilot symbols—regularly spaced pilots—for ML channel estimation, while the second pilot sub carriers 32 are distributed only within the edge regions of the OFDM signal and provide second pilot symbols—edge pilots—for MMSE channel estimation.

Of course, the present invention is not limited by the foregoing discussion, nor is it limited by the accompanying drawings. Indeed, the present invention is limited only by the following claims, and their legal equivalents.

What is claimed is:

1. A method of channel estimation for an Orthogonal Frequency Division Multiplexed (OFDM) signal, the method comprising:
   receiving an Orthogonal Frequency Division Multiplexed (OFDM) signal having an increased pilot density within one or both edge regions of the frequency band spanned by the OFDM signal, relative to a middle region of the frequency band; and
   using the increased pilot density to improve channel estimation for the OFDM signal within the one or both edge regions of the frequency band;
   wherein receiving an Orthogonal Frequency Division Multiplexed (OFDM) signal having an increased pilot sub carrier density within one or both edge regions of the frequency band spanned by the OFDM signal comprises receiving first pilot symbols via first pilot sub carriers uniformly distributed across the frequency band, and receiving second pilot symbols via second pilot sub carriers distributed in the one or both edge regions; and
   wherein using the increased pilot density to improve channel estimation for the OFDM signal within the one or both edge regions of the frequency band comprises generating first channel estimates using a Maximum Likelihood (ML) estimation process based on the first pilot symbols, and generating second channel estimates for the one or both edge regions using a Minimum Mean Square Error (MMSE) estimation process based on the second pilot symbols and biased from the ML estimation process.

2. The method of claim 1, further comprising forming improved channel estimates for the OFDM signal as a combination of the first and second channel estimates.

3. The method of claim 2, wherein forming improved channel estimates for the OFDM signal as a combination of the first and second channel estimates comprises using the first channel estimates as the improved channel estimates for a middle region of the frequency band, and using the second channel estimates as the improved channel estimates for the one or both edge regions of the frequency band.

4. A receiver circuit configured for channel estimation for a received Orthogonal Frequency Division Multiplexed (OFDM) signal having an increased pilot density within one or both edge regions of a frequency band spanned by the OFDM signal, relative to a middle region of the frequency band, the receiver circuit comprising one or more processing circuits configured to use the increased pilot density to improve channel estimation for the OFDM signal within the one or both edge regions, wherein the OFDM signal includes first pilot symbols in first pilot sub carriers that are uniformly distributed across the frequency band and second pilot symbols in second pilot sub carriers that are distributed in the one or both edge regions, and wherein the one or more processing circuits are configured to use the increased pilot density to improve channel estimation for the OFDM signal within the one or both edge regions by generating first channel estimates using a Maximum Likelihood (ML) estimation process based on the first pilot symbols, and generating second channel estimates for the one or both edge regions using a Minimum Mean Square Error (MMSE) estimation process based on the second pilot symbols and channel statistics determined from the ML estimation process.

5. The receiver circuit of claim 4, wherein the one or more processing circuits are configured to form improved channel estimates for the OFDM signal as a combination of the first and second channel estimates.

6. The receiver circuit of claim 5, wherein the one or more processing circuits are configured to form improved channel estimates for the OFDM signal as a combination of the first and second channel estimates by using the first channel estimates as improved channel estimates for a middle region of the frequency band, and using the second channel estimates as improved channel estimates for the one or both edge regions of the frequency band.

7. A method of channel estimation in a receiver configured to receive an Orthogonal Frequency Division Multiplexed (OFDM) signal, the method comprising:
   receiving an OFDM signal that includes first pilot symbols on first pilot sub carriers that are uniformly distributed across the frequency band of the OFDM signal, and second pilot symbols on second pilot sub carriers that are distributed within one or both edge regions of the frequency band;
   generating first channel estimates using a Maximum Likelihood (ML) estimation process, based on the first pilot symbols; and
   generating second channel estimates using a Minimum Mean Square Error (MMSE) estimation process, based on the second pilot symbols and channel statistics determined from the ML estimation process.

8. The method of claim 7, further comprising forming improved channel estimates for the OFDM signal as a function of the first and second channel estimates.

9. The method of claim 8, wherein forming improved channel estimates for the OFDM signal as a function of the first and second channel estimates comprises forming a combined set of channel estimates having the second channel estimates for frequencies within the edge regions and having first channel estimates for frequencies between the edge regions.

10. The method of claim 7, further comprising forming an overall set of improved channel estimates by substituting values of the second channel estimates for corresponding ones of the first channel estimates, such that the overall set of improved channel estimates comprises values of the second channel estimates for frequencies corresponding to the edge regions, and comprises values of the first channel estimates for frequencies between the edge regions.

* * * * *

UNITED STATES PATENT AND TRADEMARK OFFICE
CERTIFICATE OF CORRECTION

PATENT NO. : 7,889,799 B2
APPLICATION NO. : 11/497658
DATED : February 15, 2011
INVENTOR(S) : Guey et al.

It is certified that error appears in the above-identified patent and that said Letters Patent is hereby corrected as shown below:

In Column 6, Line 51, delete "(DFT)" and insert -- (IDFT) --, therefor.

In Column 8, Line 26, in Equation (15), delete "$h[n]=\overline{h}[n]+\tilde{h}[n]$" and insert -- $h[n]=\overline{h}[n]+\tilde{h}[n]$ --, therefor.

In Column 8, Line 35, in Equation (16), delete "
$$\Gamma[k_1-k_2] \triangleq E\{(H[k_1]-\overline{H}[k_1])(H[k_2]-\overline{H}[k_2])^*\}$$
$$= \sum_{n=0}^{K-1} \gamma[n] e^{-j\frac{2\pi n(k_1-k_2)}{K}}$$
" and insert -- $\Gamma[k_1-k_2] \triangleq E\{(H[k_1]-\overline{H}[k_1])(H[k_2]-\overline{H}[k_2])^*\} = \sum_{n=0}^{K-1}\gamma[n]e^{-j\frac{2\pi n(k_1-k_2)}{K}}$ --, therefor.

In Column 9, Line 22, in Equation (24), delete "$[\Pi_{H_p}]_{ij}=E\{(H[p_i]-\overline{H}[p_i])(H[p_j]\overline{H}[p_j])^*\}=\Gamma[p_i-p_j]$" and insert -- $[\Pi_{H_p}]_{ij}=E\{(H[p_i]-\overline{H}[p_i])(H[p_j]-\overline{H}[p_j])^*\}=\Gamma[p_i-p_j]$ --, therefor.

In Column 9, Line 50, delete "Λe" and insert -- Λ_e --, therefor.

In Column 10, Line 64, in Equation (36), delete "$[\overline{H}]_i=\hat{H}_{MLX_r}[i],$" and insert -- $[\overline{H}]_i=\hat{H}_{MUX_r}[i],$ --, therefor.

Signed and Sealed this
Sixteenth Day of August, 2011

David J. Kappos
*Director of the United States Patent and Trademark Office*

CERTIFICATE OF CORRECTION (continued)
U.S. Pat. No. 7,889,799 B2

In Column 11, Line 1, in Equation (37), delete "$[\tilde{H}_e]_i = \hat{H}_{ML|X_r}[e_i],$" and insert -- $[\bar{\mathbf{H}}_e]_i = \hat{H}_{ML|\mathbf{X}_r}[e_i],$ --, therefor.